United States Patent

[11] 3,598,985

[72] Inventors John D. Harnden, Jr.; William P. Kornrumpf, both of Schenectady, N.Y.

[21] Appl. No. 784,075
[22] Filed Dec. 16, 1968
[45] Patented Aug. 10, 1971
[73] Assignee General Electric Company

[54] CONSTRUCTION OF DISPOSABLE PHOTOFLASH LAMP ARRAY
21 Claims, 11 Drawing Figs.

[52] U.S. Cl. .......... 240/1.3, 95/11 L, 339/17 D
[51] Int. Cl. .......... G03b 15/02
[50] Field of Search .......... 240/1.3; 95/11; 431/95; 339/17 L, 17 D, 147; 337/297

[56] References Cited

UNITED STATES PATENTS

| | | | |
|---|---|---|---|
| 2,934,627 | 4/1960 | Bristol et al. | 337/297 X |
| 3,430,545 | 3/1969 | Wick | 240/1.3 X |
| 3,438,315 | 4/1969 | Goshima et al. | 240/1.3 X |
| 3,473,880 | 10/1969 | Wick | 240/1.3 X |

FOREIGN PATENTS

| | | | |
|---|---|---|---|
| 867,090 | 5/1961 | Great Britain | 337/297 |

*Primary Examiner*—John M Horan
*Assistant Examiner*—Alan Mathews
*Attorneys*—Frank L. Neuhauser, Oscar B. Waddell, James J. Lazna, Henry P. Truesdell and Joseph B. Forman

ABSTRACT: A disposable flashbulb or photoflash lamp array designed for use with static electronic flashing circuits comprises a rigid pluggable single-bladed or multibladed printed circuit contact member, preferably having a metallic substrate, that mounts a planar or linear group of lamps together with reflectors, if desired, and a transparent envelope in a low cost sturdy construction with a reliable contact system. The reflectors can be integral with the pluggable contact member.

Inventors:
John D. Harnden, Jr.
William P. Kornrumpf,
by Donald R. Campbell
Their Attorney.

Inventors:
John D. Harnden, Jr.
William P. Kornrumpf,
by Donald R. Campbell
Their Attorney Inventors:
John D. Harnden, Jr.
William P. Kornrumpf,
by Donald R. Campbell
Their Attorney

CONSTRUCTION OF DISPOSABLE PHOTOFLASH LAMP ARRAY

Certain features of the photoflash lamp array are disclosed and claimed in the concurrently filed application of Stanely L. Slomski entitled "Photoflash Lamp Array," Serial No. 784074, assigned to the same assignee as the present invention.

This invention relates to the construction of a disposable photoflash lamp array, and more particularly to a low cost photoflash lamp array having a unitary construction that can be plugged into a camera or flash accessory for the taking of flash exposures.

In order to expose a plurality of frames of photographic film under conditions requiring artificial light without the need of manually replacing each burned out flashbulb with an unused bulb each time a picture is taken, it has been proposed to mount several flashbulbs or lamps in a unitary package and either move the array between exposures or move the contact system making electrical connection to the array. The presently well-known flash cube system comprises four flashbulbs and their reflectors facing toward the four sides of the cube, with provision for turning the cube as the film advance is actuated to place a new bulb in position to be flashed. In another system a series of bulbs are mounted linearly on a nonconductive strip of cardboard, plastic, or the like, and the series strip is manually moved past a contact system on the camera or flash gun accessory to successively make connection directly to the individual bulb leads or to contacts on the mounting strip that are in electrical connection with the bulb leads. A different proposed arrangement also utilizes an array of flash lamps mounted on a cardboard insert that is folded to supply reflector surfaces. While it is intended that this flash lamp array be in the form of a unitary insert and remain stationary on the flashgun accessory, it is necessary to provide sliding or rotary contacts that are switched from one lamp to the next either manually or in conjunction with the film advance or shutter actuation. While these and other prior art linear photoflash lamp arrays achieve certain objectives of low cost and disposability, they have movable contact systems that are sometimes unreliable and make connection to only one bulb at a time, and the disposable unit further often is of flimsy construction.

The wide availability of a variety of solid state switching devices such as thyristors and transistors, in combination with the advantages of the economical miniaturized fabrication of electrical circuits by monolithic and hybrid integrated circuit techniques, has led to the development of improved sequential flashing circuits for multiple photoflash lamp arrays that use static-switching principles. Because of the high speed at which it is possible to switch between the bulbs, the new static electrical flashing circuits can incorporate additional features such as the ability to bypass defective lamps and flash the next lamp in the array while the shutter remains open, thereby preventing loss of the exposure. It is also possible to flash more than one lamp at a time if additional light is needed. Circuits of this type are designed for use with a nonrotatable planar or linear array of photoflash lamps, and it is convenient to package the array as a disposable unit complete with built-in reflector surfaces that can be plugged into the camera or flash accessory and thrown away when all the lamps are flashed. Since the switching between lamps is accomplished electrically within the static sequential flashing circuit, movable contact structures are not required, and it is further necessary to make connection to more than one lamp at a time in order to sense defective lamps. Certain other improvements in the construction of the disposable array can also be made as compared to the previously mentioned prior art devices, none of which are designed to be flashed by static electrical control circuits.

Accordingly, an object of the invention is to provide an improved disposable photoflash lamp array incorporating a nonrotatable planar or linear array of lamps, featured by a sturdy unitary construction that makes reliable plug-in connection to a camera or flash accessory.

Another object is the provision of a low cost disposable photoflash lamp array especially suited for use with static sequential flashing electrical circuits that make simultaneous connection to all of the lamps in the array.

Yet another object is to provide a disposable photoflash lamp array of the foregoing type having an integral reflector and pluggable printed circuit member for mounting and interconnecting the lamps.

In accordance with the invention, a disposable photoflash lamp array construction comprises a substantially rigid printed circuit support and contact member comprising a relatively thin substrate having on at least one surface conductive patterns in the form of a plurality of terminal areas at one edge thereof that are selectively interconnected with a plurality of lamp contact areas. A group of photoflash lamps each has at least one lead secured in electrical connection with one of the lamp contact areas. Mounting means holds together the support and contact member and attached group of photoflash lamps as a unitary structure. One or more reflectors can be located adjacent the group of photoflash lamps, and can be formed integrally with the support and contact member.

The foregoing and other objects, features, and advantages of the invention will be apparent from the following more particular description of several preferred embodiments of the invention, as illustrated in the accompanying drawings wherein.

Figure 1:
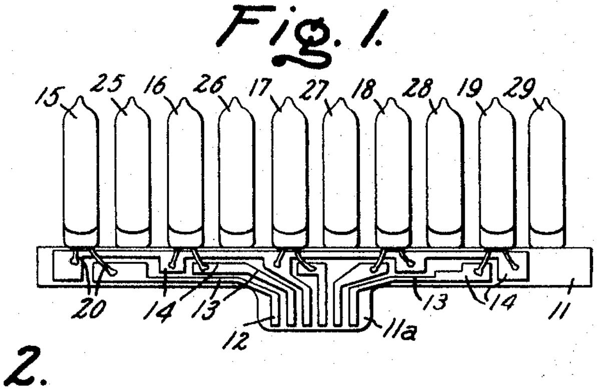
FIG. 1 is a front view of the printed circuit support and contact bar with two rows of attached photoflash lamps, one on each side of the bar.

The T-shaped printed circuit bar or blade 11 shown in FIG. 1 is used to implement a reliable and inexpensive contact system for the disposable photoflash lamp array, and at the same time provides a sturdy support for the lamps and their reflectors. Although the support and contact bar 11 is relatively thin, it has a substantial degree of rigidity and preferably has a projecting contact tab 11*a* centrally located along one of its long edges. On both surfaces of the bar 11 is a printed circuit conductive pattern. This conductive pattern includes a plurality of terminal areas 12 on the contact tab 11*a* in the form of elongated strips that extend perpendicular to the edge of the tab. The terminals 12 are selectively interconnected by suitably shaped conductive lines 13 with a plurality of lamp contact areas or pads 14. The contact pads 14 are aligned adjacent the opposing edge of the bar 11, there being two contact pads for each of the lamps. While the number of photoflash lamps in the array is immaterial, there is shown by way of illustration ten lamps 15—19 and 25—29 arranged in two five-lamp rows mounted respectively on each side of bar 11. Each lamp has a pair of leads 20 secured in some suitable fashion, as by soldering or welding, in electrical connection with an adjacent pair of the lamp contact pads 14. The photoflash lamps are tubular and are baseless, and as is well known comprise an hermetically sealed containing a filament and filled with a combustible material which ignites and produces a light flash when current is supplied to the filament through the leads 20. The lamps can be of the type described in U.S. Pat. No. 2,982,119 dated May 2, 1961. It will be noted that for a row of five lamps there are six of the terminals 12, one for each of the lamps and one that is in common to all of the lamps.

In order to be low cost and substantially rigid, the printed circuit support and contact bar 11 is preferably made by mass fabrication techniques such as the thick film technology. Thus, referring to FIG. 2, the bar 11 comprises a thin metallic substrate 23 having on both of its surfaces a coating of a insulating material 24 on which is deposited the printed circuit conductive patterns 12—14. In the preferred arrangement, the metallic substrate 23 is made of steel, the insulating material 24 is porcelain enamel or glass, or some other suitable vitreous material, and the conductive patterns 12—14, which can be monolayer and thus very inexpensive, are made of silver and glass paste. One workable system uses extra low carbon enameling steel as a substrate. Ferro Enamel Corporation frit No. 208 or 2,028 is ground into a powder, mixed with suspension materials, then coated on the steel by dipping or spraying, dried, and fired. The conductive patterns are screen printed with Dupont silver preparation 7,713 (electronic grade), dried, and fired in a kiln. It will be evident that the invention is not limited to these particular materials ad printed circuit fabrication techniques, since the printed circuit art is well developed and a variety of materials and processes are available. It is pointed out, however, that in order to be reliable the preferred contact system uses plated copper or silver. It is within the scope of the invention to form the bar 11 from laminated constructions of copper foil with various types of insulating sheets such as epoxy glass or fiber board, although these may be less desirable for certain purposes. Plastic or paper substrates can also be utilized. The enameled steel substrate with screen printed silver printed circuit patterns, however, has the desired characteristic of low cost, ease of fabrication, and sturdiness.

Figures 2, 3, 4:
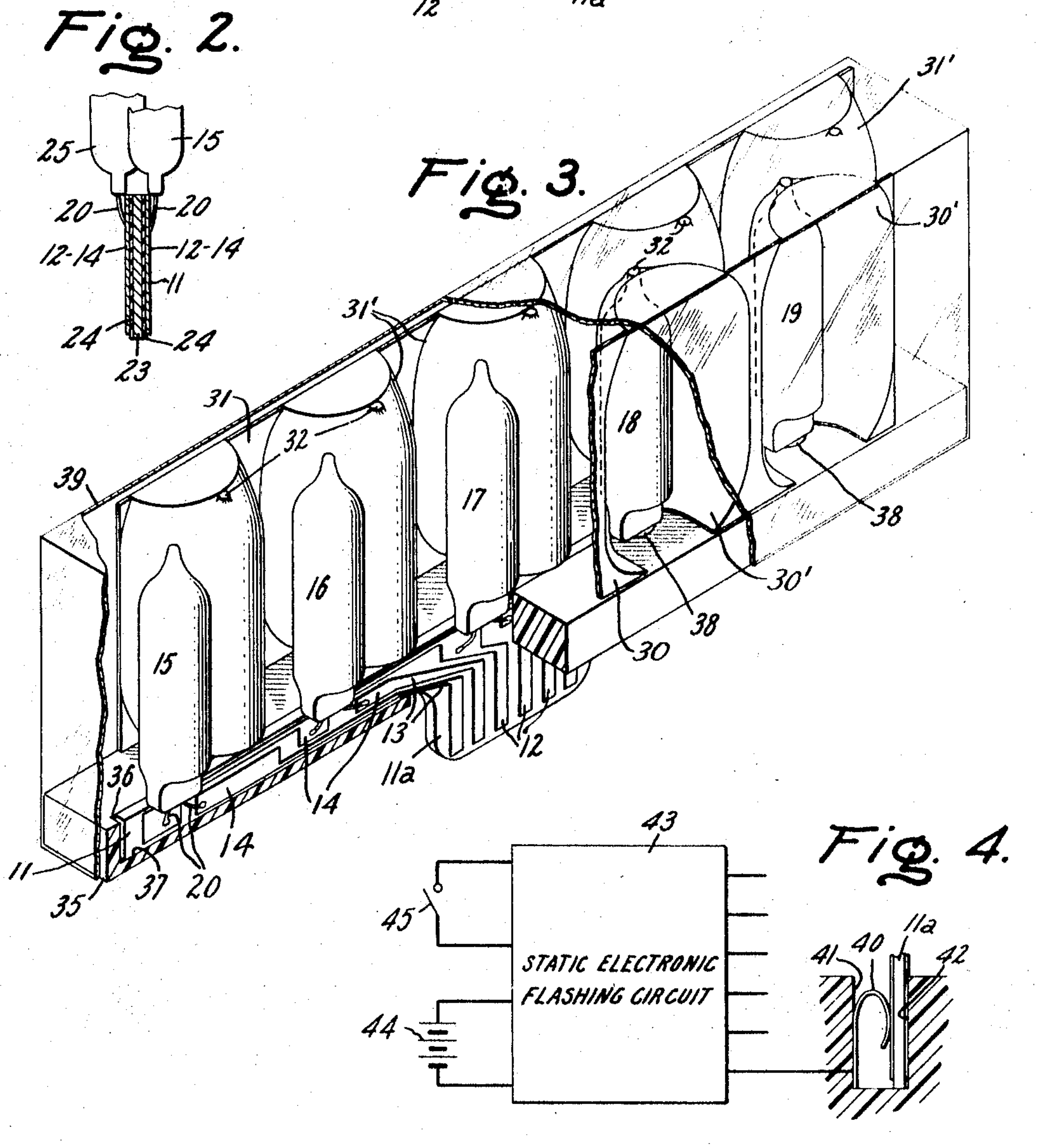
FIG. 2 is an enlarged end view, with portions broken away, of the subassembly shown in FIG. 1.
FIG. 3 is a perspective view of the complete disposable lamp array, with portions broken away to show interior detail.
FIG. 4 is a schematic end view of the a contact assembly in which is inserted the tab of the disposable lamp array, the contact assembly being connected to a static electronic flashing circuit shown here diagrammatically.

As can be seen in both FIGS. 1 and 3, the second row of lamps secured to the lamp contact pads on the reverse side of the support and contact bar 11 is parallel to the row of lamps 15—19 but staggered with respect thereto. This second row of lamps comprising the lamps 25—29 for the sake of compactness extends into the spaces between the lamps in the first row, so that the two parallel staggered rows can be said to be interfitting or overlapping. The axes of the individual lamps are, of course, substantially in parallelism, and it is seen that the lamps are upstanding from the bar 11, and the planes through the axes of the lamps in each of the rows are approximately parallel to the plane of the bar 11. The disposable photoflash lamp array includes reflectors for the lamps that are inserted down between the two rows. While it is possible to use a common undulated reflector for the two rows of lamps, it has been found in practice that it is not possible to obtain the most desirable reflector characteristic in this manner. For this purpose, two reflectors 30 and 31 are provided, and these are inserted down between the two rows of lamps in interfitting or nested relationship. Each of the reflectors is formed from a sheet of inexpensive material having a high reflectance, such as aluminized plastic or a sheet of thin aluminum foil or other suitable reflectance or specular surfaces. The two reflectors 30 and 31 can be identical, and each comprises a row of five individual reflector shells or cells 30′ and 31′, respectively having a complex paraboliclike shape that are connected together at their front edges. Conveniently each individual reflector cell 30′ or 31′ has at its tip an indentation 32 for receiving the tip of its respective lamp. The specific shape of the individual reflector cells does not form an essential part of this invention, and any suitable shape can be employed. Instead of relying on the indentations 32 to center the individual lamps with respect to their reflector cells to optimize the reflected light, the accurate location of the lamp contact pads 14 can supply this function. In practice the contact pads 14 can be made smaller than illustrated, and the lamp leads 20 are relatively larger, so that securing the lamp to its contact pads serves to center the lamps within the reflector cells.

The support and contact bar 11 together with the two rows of lamps 15—19 and 25—29, and the two reflectors 30 and 31 inserted between them in interfitting relationship, are all mounted together as a unitary structure that can be plugged onto a camera or flash accessory as a unit and then removed and thrown away when all of the lamps have been flashed. To this end, an elongated mounting block 35 made, for instance, of plastic has an elongated central slot 36 for receiving the support and contact bar 11. The central portion of the slot 36 extends all the way through the block 35 to allow passage therethrough of the contact tab portion **11*a* of the bar 11. The ends of the slot 36, however, do not extend all the way through the block 35 and provide a ledge 37 for supporting the ends of the bar 11. The top surface of the block 35 is provided with clearance recesses 38 for receiving leads 20 of the various individual lamps. The bottom edges of the two nested reflectors 30 and 31 rest on the top surface of the mounting block 35. A rectangular transparent plastic envelope 39 is inserted down over the assembled lamps and reflectors and also encases the four sides of the mounting block 35. The envelope 39 is ultrasonically welded or otherwise suitably fastened to the mounting block 35** to provide a unitary construction.

Referring to FIG. 4, the disposable flashbulb array is removably received in a mating edge connector assembly that is either fastened to the outside wall of the camera or flash accessory housing, or is preferably recessed down into the center of the housing. The contact assembly comprises, for example, a row of six aligned inverted U-shaped springs 40 each having one leg fastened to a wall 41. The contact tab **11*a* is inserted into the recess between the free ends of the springs 40 and an opposing surface 42. In this manner there is obtained a reliable wiping contact between each of individual springs 40 and one of the terminal strips 12 on the tab 11*a***.

The springs 40 are electrically connected with a static electronic flashing circuit indicated generally by the block 43. The static electronic flashing circuit 43 is typically energized by a battery 44 and is placed into operation by the closing of a shutter switch 45. To briefly describe its function, the static electronic flashing circuit 43 flashes one row of the photoflash lamps in sequence, with provision being made to stop the sequencing when one of the lamps has been flashed. Switching between the individual lamps in a row is accomplished electronically within the circuit 43, and there is not need for moving contacts in the disposable lamp array itself or in the contact assembly into which it is plugged. When one row of the lamps has been flashed in sequence in response to repeated actuations of the shutter switch 45, the array is taken out, turned around, and reinserted in the contact assembly with the other side of the contact tab **11*a* in engagement with the springs 40. Lamps in the second row are then flashed in sequence. As was mentioned previously, the use of a static electronic flashing circuit requires that connection be made simultaneously to each lamp in one row. This is because of the inherent rapidity of switching by the circuit 43 from one lamp to the next, as a result of which open circuited or burned out lamps can be automatically bypassed and the next lamp flashed while the shutter remains open. More advanced versions of the circuit 43** provide guaranteed flash and exposure capabilities obtained by sensing other types of defective lamps such as flashed short-circuited lamps or nonhermetically sealed bulbs so that a succeeding lamp can be flashed before the shutter closes. Suitable static electronic flashing circuits that can be used are described in the following four concurrently filed applications, all filed concurrently herewith and assigned to the same assignee as the present invention: Ser. No. 784,093, by John D. Harnden, Jr. and William P. Kornrumpf; Ser. No. 784,067, by John D. Harnden, Jr., William P. Kornrumpf, and Robert A. Marquardt; Ser. No. 793,636 by John D. Harnden, Jr. and William P. Kornrumpf; and Ser. No. 784,094 by Paul T. Cote' and John D. Harnden, Jr.

A particular advantage of the photoflash lamp array construction herein described is that all of the lamp contacts, i.e., the terminals 12, are located relatively close together in a small space. As compared to prior arrays that require two contacts per lamp, this array flashed by static electrical circuits has one common terminal for all the lamps on one side that face in the same general direction and the number of contacts is accordingly reduced. The contacts can furthermore be mass manufactured with precision in such a manner as to assure registration with the mating contacts into which the array is plugged. The surface-to-surface contact of the terminals 12 with the springs 40 in the edge connector assembly is a reliable, inexpensive contact system. Instead of having a single, centrally located tab 11*a* on which all of the terminals 12 are placed, there may be two tab sections, one at each end of the bar 11, each containing half of the terminals. With a tab at each end of the bar (not shown), the user cannot inadvertently rotate the array while plugged into its socket with resultant damage to the female spring assembly. When a single, centrally located contact tab 11*a* is used, it is of course possible to put projections on the mounting block 35 that engage with recesses or grooves on the camera or flash accessory to hold the array more securely in place. With a few modifications, it is evident that the array shown in FIG. 3 could be designed with one row of lamps and one reflector, and that the lamps can be mounted with their axes perpendicular to the plane of bar 11 for end firing rather than parallel as shown. Moreover, the lamps need not be arranged in rows, but can be in any desired planar or multisided geometrical configuration in which the lamps on each side are nonrotatable. Although the array of FIG. 3 must be removed and turned around when one side of the array has been flashed in order to flash the lamps on the other side or sides, the group of lamps on one side all face in the same general direction and in this sense are nonrotatable since they need not be physically moved to fire another lamp.

Figure 5:
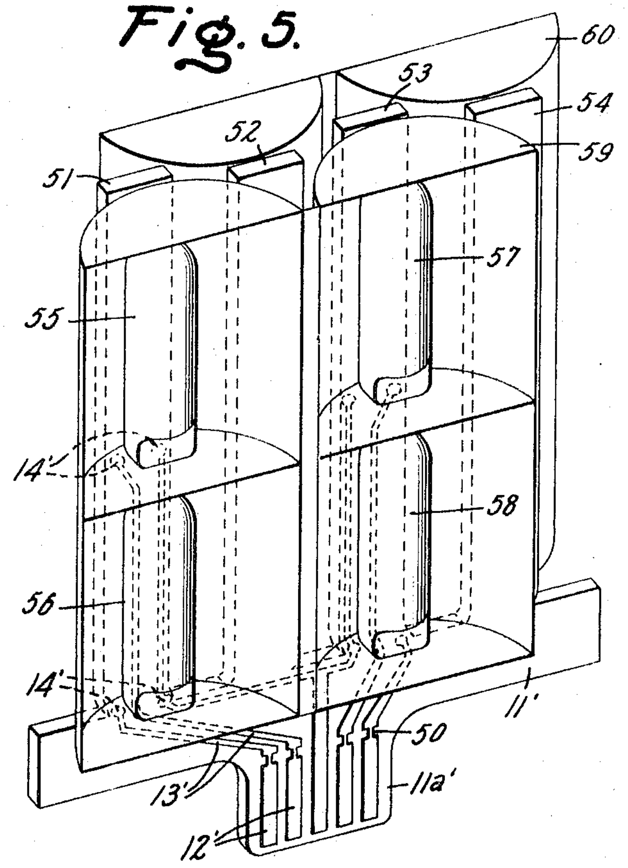
FIG. 5 is a perspective view of the essential features of another embodiment of the invention including a planar group of lamps.

The embodiment of the invention illustrated in FIG. 5 is suitable for planar arrays comprising two or more stacked rows of lamps. By way of example there is illustrated an array of eight lamps, four to a side arranged in a rectangle or square. The base portion of the support and contact bar 11' has a configuration similar to that shown in FIG. 1, with a centrally located contact tab 11*a'* containing a row of five aligned terminals 12', one for each of the four lamps and one in common. One point of difference shown here is that the terminals 12' or the conductive lines 13' can include a printed circuit current fuse 50. The current fuse 50 is obtained by reducing the width of a conductive strip over a preselected length such that it will support a given level of current for a predetermined amount of time, but will thereafter break to open the circuit. This is commonly known as the $I^2T$ current fuse. In order to understand the operation of the fuse 50, it should be understood that a good photoflash lamp will flash and burn out the filament to open the circuit after a given interval of time of about 8 milliseconds or so. Current will still be supplied to a defective lamp after this period of time, however, and the fuse 50 is arranged to break at a selected time after a good lamp would have flashed. Defective lamps include the flashed short-circuited lamp that becomes short circuited after flashing due to a mass of molten combustible material which falls upon the filament support wires and solidifies. Another type of defective lamp is the nonhermetically sealed lamp, called an air bulb, that does not produce a usable flash of light although the filament does burn out and open the circuit after a longer period of time. By delaying the breaking of the fuse 50 until after a good lamp would have flashed, the static electronic flashing circuit 43 will flash the next lamp in sequence having a continuous filament when a subsequent exposure is made, rather than be disabled by attempting to reflash a defective lamp.

Another type of fuse that can be used is a discrete fuse wire secured at each end to and bridging a discontinuity in the conductive pattern. Still another involves fabricating all the fuses in a localized area by photolithography techniques. The batch processing results in reproducible characteristics. This fuse has been used previously for diode matrices and is described in the pamphlet "Integrated Diode Matrices" published by Radiation, Inc., Melbourne, Florida, 3rd Edition, copyright 1967.

One possible structure for mounting the lamps in a square planar array is to mount them on four upstanding columns or fingers 51—54 that are integral with the bar 11'. The two fingers 51 and 53 are bent back slightly from the plane of the bar 11' and mount the four lamps 55—58 that face forward and are flashed from this side of the array. The other two fingers 52 and 54 are parallel to and staggered with respect to the fingers 51 and 53 and bent slightly forward of the plane of the bar 11' to mount the four lamps not here shown that are on the other side of the array and are flashed when the array is removed and turned around and reinserted into the contact assembly. The lamp contact tabs 14' are preferably deposited directly onto the inner surfaces of the upstanding fingers, and the conductive lines 13' run directly from the ends of the terminal strips 12', across the surface of the bar 11' and up the inner surface of the fingers 51—54 as needed. The middle terminal 12' is the common terminal and makes connection to one lead of each of the lamps 55—58 in the same manner. As shown, lamps 56 and 55 are mounted one above the other on the finger 51, and lamps 58 and 57 are in the same manner mounted one above the other on the finger 53. The integral bar 11' and fingers 51—54 together form a printed circuit member that can be fabricated from the same materials and using the same techniques as previously described.

In a manner similar to or analogous to that shown in FIG. 3, a reflector 59 is mounted behind the square group of lamps 55—58 between these lamps and the fingers 51 and 53. Another reflector 60 is mounted in nesting or interfitting relation between the fingers 52 and 54 and the second square group of lamps (not here shown) on the other side of the disposable unit. The subassembly illustrated in FIG. 5 can be inserted into a mounting block 35 of the type shown in FIG. 3, and provided with a transparent envelope 39 for holding together the subassembly. This embodiment containing two parallel staggered square groups or arrays of lamps is similar in shape to a cigarette pack and has the same characteristic and advantages that have been described for the linear planar array of FIG. 3.

Figure 6:
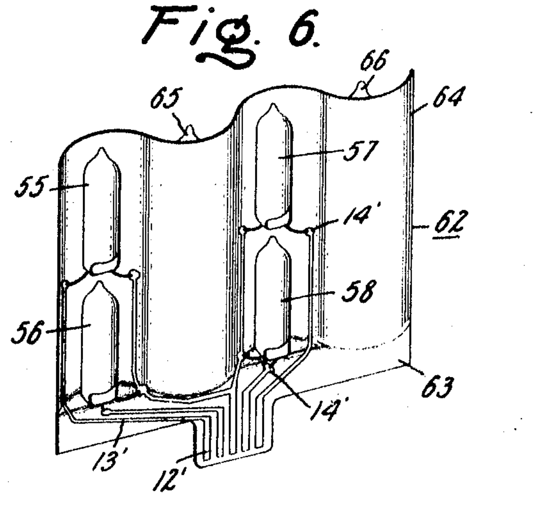
FIG. 6 is a perspective view of an integral reflector and support and contact member that can be used alternatively in constructing the FIG. 5 array.

In order to reduce the cost of the disposable array still further, the reflector can be made integral with the support and contact bar 11 or 11' and can also be used for mounting the lamps. FIG. 6 shows an integral reflector and support and contact member useful in fabricating a square array of lamps of the type shown in FIG. 5, but it is obvious that the same principles can be applied to other geometries. The integral member 62 comprises a flat rigid support and contact bar portion 63 that can be identical to the bar 11'. The reflector portion 64 of the integral member 62 has an undulated configuration on which are deposited the lamp contact pads 14' interconnected by deposited conductor lines 13' that connect to the terminal strips 12'. The portions of the reflector 64 containing the conductive patterns is analogous to the fingers 51, 53 in FIG. 5. The lamps 55 and 56 are mounted one above the other in a trough in the reflector portion 64, while the other two lamps 57 and 58 are similarly mounted in the adjacent trough. The square array of lamps on the other side of the disposable unit, of which only the upper lamps 65 and 66 are visible, are mounted in the troughs that appear in the reverse side of the reflector portion 64. The integral printed circuit member 62 thus replaces the contact bar 11', the four lamp mounting fingers 51—54, and the two reflectors 59 and 60 of FIG. 5. The reflector portion 64 obviously provides a common reflector for all eight lamps of the parallel staggered square arrays, as well as the support on which the lamps are mounted. Conveniently the integral member 62 is fabricated by thick film techniques using a metallic substrate so that the metal substrate can be stamped or formed in a single operation, following which it can be coated with enamel or porcelain or other insulating material and the conductive patterns printed on the insulating material.

Figures 7, 8:
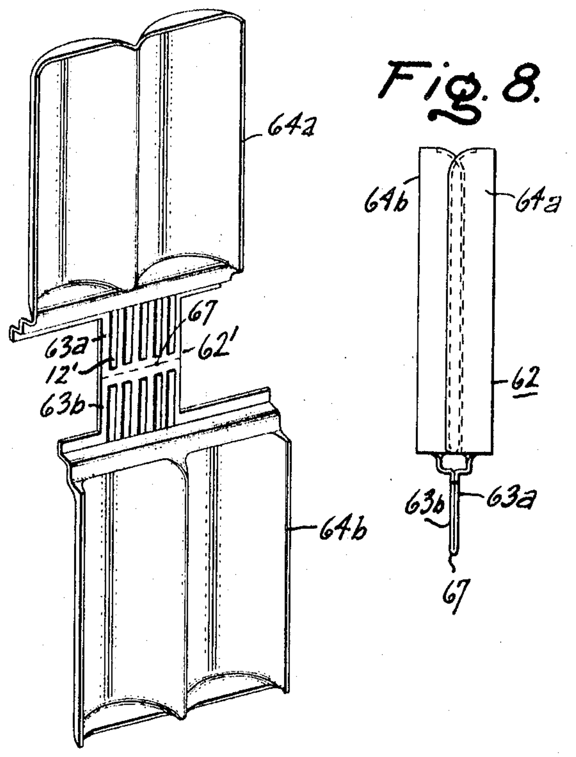
FIG. 7 shows a perspective view in unfolded form, without attached lamps, of a modification of the integral member illustrated in FIG. 6 that is constructed to have separate reflector surfaces.
FIG. 8 is a side view of the integral member of FIG. 7 folded so that the separate reflectors nest together.

Although the common reflector 64 of the integral member 62 is inexpensive to manufacture, the resulting shape of the reflector surfaces on either side of the reflector are not optimum. For much the same reason that two reflectors 30 and 31 are used in the FIG. 3 array, and two reflectors 59 and 60 in the FIG. 5 array, the integral member 62 can be formed as a single two-part unit with reflector surfaces that are optimized for each array of lamps. Thus, as is illustrated in FIG. 7, the integral member 62' is formed as a single stamped piece that folds back upon itself at the fold line 67. When folded together (see FIG. 8), the support and contact portions **63*a* and 63*b* are oriented back to back and the reflector portions 64*a* and 64*b* are each formed with two optimum reflector surfaces that nest or interfit in much the same way that the reflectors 30 and 31 in FIG. 3 nest together. Although not here shown, it is obvious that one set of interconnecting conducting lines and lamp contact pads are on the outer surface of one half of the unit, while the other set is on the outer surface of the other half of the unit. The integral member 62'** can be stamped from a sheet of metal or otherwise formed in a single operation, and thus it is apparent that improved reflector surfaces can be obtained for each of the planar array of lamps at little additional cost.

Figures 9, 10, 11:
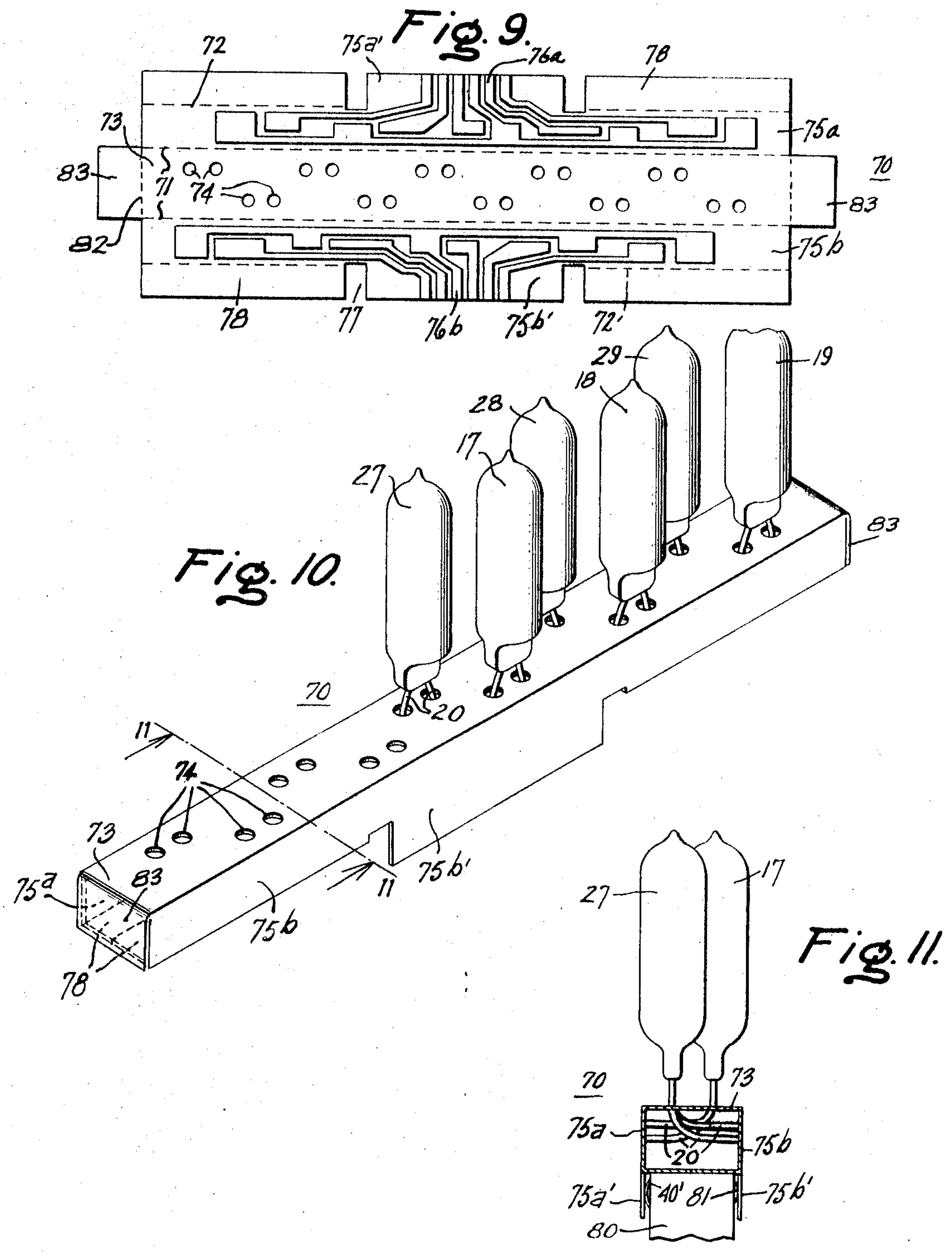
FIG. 9 is a bottom plan view of the double-bladed support and contact member blank used in still another embodiment of the invention that plugs onto the camera in a different way.
FIG. 10 is a perspective view of the support and contact member of FIG. 9 after folding, further showing several attached lamps.
FIG. 11 is a cross-sectional view of the subassembly of FIG. 10 taken on the line 11–11 thereof, shown mounted on a camera.

The embodiment of the invention shown in FIGS. 9—11 features an array with a double-bladed support and contact member that straddles the camera or flash accessory when plugged in place. The mating edge connector assembly can then be at the side of the camera or flash accessory housing rather than at the center, which is the usual location of the edge connector assembly for receiving the single-bladed support and contact members previously described (see FIG. 4). This embodiment will be illustrated with regard to a linear array of photoflash lamps similar to that shown in FIG. 3, although it can also be used to mount planar arrays of lamps or lamps in some other geometrical pattern. The double-bladed support and contact member 70 is shown in plan view in FIG. 9 before folding along a first pair of fold lines indicated by the pair of dashed lines 71, a second set of four fold lines indicated by the dashed lines 72, and an additional pair of fold lines 82, one at each end. The various constituent portions of the integral member 70 separated by these fold lines will now be described. The central bight portion 73 has two parallel staggered rows of aperture pairs 74 for receiving the leads 20 of a linear array of photoflash lamps of the type shown in FIG. 3. For an array of ten lamps, there are five of the aperture pairs 74 in each row. At either side of the bight portion 73 are two identical contact bars **75*a* and 75*b* that are respectively provided with mirror image conductive patterns, here indicated generally by the numerals 76*a* and 76*b*. The conductive patterns 76*a* and 76*b* can be identical to the conductive patterns for the support and contact bar 11 shown in FIG. 1, and include terminal strips on centrally located contact tabs 75*a*' and 75*b*' that are selectively interconnected by conductive lines with a plurality of lamp contact pads, two for each lamp of which one is a common terminal. A rectangular area of metal is punched out at either side of the contact tabs, as indicated by the numeral 77, to thereby delineate the contact tabs and two pairs of wing portions 78, one at either side of each contact tab. The member 70 is completed by two end tabs 83. The double-bladed member 70 is preferably made of an enameled steel substrate with screen printed silver conductive patterns in the manner already described. If the enamel is a type which cracks upon folding, it may be necessary to coat with enamel and print the conductive patterns after folding the member 70**.

Referring also to FIG. 10, the two contact bars **75*a* and 75*b* are bent in the same direction at right angles to the bight portion 73 such that the conductive patterns 76*a* and 76*b* face inwardly toward one another. The four wings 78 are then folded inwardly at right angles with respect to the folded contact bars, and the end tabs 83 are bent downwardly, thereby forming a generally U-shaped structure whose two ends, at either side of the projecting parallel contact tabs 75*a*' and 75*B*' are in the form of closed-end boxes. The two lamp leads 20 of the photoflash lamp 27 for example (not all of the lamps are illustrated) are inserted down through the appropriate pair of apertures 74, bent over toward the contact bar 75*b*, and secured in electrical connection with the appropriate pair of contact pads on the conductive pattern 76*b*. In similar manner, the leads 20 of the lamp 17 are inserted down through the pair of apertures or lamp lead-receiving holes 74 in the next row, bent over toward the contact bar 75*a*, and secured to the conductive pattern 76*a*. Assuming that the steel substrate of which the member 70 is made is coated with enamel subsequent to the punching of the lamp lead-receiving holes 74**, it will be seen that the edges of the holes will be coated with an insulating material. Alternatively, it may be necessary to coat the edges of the holes with epoxy or other insulating material in order to prevent the leads from contacting the steel substrate.

When an array is constructed with the double-bladed support and contact member 70, the mating edge connector spring assembly on the camera or flash accessory is located at the side of the camera or accessory housing. As is shown in FIG. 11, a row of six aligned contact springs 40' are mounted on the surface of the camera or flash accessory housing 80, or in a shallow recess in the housing wall. The springs 40' may be inverted U-shaped springs of the type shown in FIG. 4, or can be semicircular-shaped springs. The opposing wall of the housing 80 may have a projecting rounded rail 81, or pair of projecting buttons, made of the same material as the housing 80 or of a suitable metallic or plastic material. The double-bladed support and contact member 70 is inserted down over the edge of the housing 80, straddling it, so that the terminals on the inside of the contact tab **75*a*', for instance, contact the springs 40'. After flashing one row of lamps, the array is removed and turned around and reinserted on the camera with the terminals on the contact tab 75*b*' in contact with the springs 40'** so that the other row of lamps can be flashed.

One advantage of the double-bladed array shown in FIGS. 9—11 is that the lamp leads 20 of several lamps at each end of the array are enclosed within the boxed-in ends of the folded member 70 and thus are out of contact with the hands of the photographer. With the double-bladed arrangement, furthermore, the user cannot inadvertently swivel the array once it is plugged onto the camera. This construction does not require the use of separate mounting block 35 (see FIG. 3) since its function is provided by the bight portion 73 and the folded-in wings 78 and end tabs 83. Although not here illustrated, the two reflectors 30 and 31 can be disposed between the two rows of lamps in nesting relation resting for support on the bight portion 73, and the transparent envelope 39 can be inserted down over the subassembly and suitably fastened to the outer surfaces of the contact bars **75*a* and 75*b*. A particular advantage of the use of the pairs of lamp lead-receiving holes 74 is that, when accurately punched in the member 70, they serve to center the individual photoflash lamps with respect to the individual reflecting surfaces on the nested reflectors 30 and 31** so that the light emitted by the flashbulbs when they are flashed is reflected with greater efficiency.

In summary, the disposable photoflash lamp array has a low cost sturdy construction that is adapted to be mass manufactured. An essential feature is the use of a printed circuit support and contact member to obtain reliable and inexpensive connection both to the group of photoflash lamps and to a contact system on the camera or flash accessory. The array can easily be inserted and removed by the photographer by a simple plug-in and pullout motion. The new flashbulb array is especially designed for use with static electronic flashing circuits that make simultaneous connection to all the lamps in the array that face in the same general direction, but is not restricted thereto since it can also be used with a moving contact that makes successive connection with the individual terminals other than the common terminal. The array can be designed to be either single-sided with a group of lamps that face all in one direction or double-sided as illustrated, and the lamps can be arranged in geometrical patterns other than the single rows or stacked rows that are shown. For example, the lamps can be mounted in a circular pattern which may be considered to be more effective for end fired arrays. Moreover, the inclusion of reflectors in the array itself is not required, since the reflecting surfaces can be on the camera or flash accessory.

While the invention has been particularly shown and described with reference to preferred embodiments thereof, it will be understood by those skilled in the art that the foregoing and other changes in form and details may be made therein without departing from the spirit and scope of the invention.

What we claim as new and desire to secure by Letters Patent of United States is:

1. A disposable photoflash lamp array construction comprising a substantially rigid printed circuit support and contact member comprising a relatively thin substrate having on at least one surface thereof electrically conductive patterns in the form of a plurality of terminal areas at one side edge of said member that are selectively interconnected with a plurality of lamp contact areas, a group of photoflash lamps each having a pair of leads secured in electrical connection with respective ones of said lamp contact areas, all the said lamp contact areas and terminal areas connected to said leads being located entirely on the same one side of U-shape support and contact member and the lamp contact areas connected to one lead of each lamp being electrically coupled together in common to a common terminal area, and mounting means for holding together said support and contact member and attached group of photoflash lamps as a unitary structure.

2. A construction as set forth in claim 1 wherein all of said terminal areas are located adjacent one another on a projecting tab at the first mentioned side of said support and contact member for insertion into a mating contact assembly.

3. A construction as set forth in claim 1 further including a reflector disposed behind said group of lamps, and wherein said lamp contact areas are in the form of contact pads that are accurately located on said support and contact member to effect centering of the individual lamps with respect to said reflector.

4. A construction as set forth in claim 1 wherein the conductive pattern connecting to one lamp contact area for one or more lamps in the array includes a current fuse.

5. A construction as set forth in claim 4 wherein said fuse is a printed circuit fuse.

6. A construction as set forth in claim 1 wherein the substrate of said support and contact member on which the conductive patterns are deposited is made of enameled steel.

7. A construction as set forth in claim 1 further including at least one reflector for said array of photoflash lamps for reflecting light emitted therefrom toward a desired direction, said reflector being integral with said support and contact member and forming an integral member.

8. A construction as set forth in claim 7 wherein at least some of said photoflash lamps are mounted in the integral reflector portion of said integral member.

9. A construction as set forth in claim 7 further including a second integral member comprising a support and contact member and an integral reflector, said integral members being folded one against the other.

10. A construction as set forth in claim 1 wherein said support and contact member is single bladed.

11. A construction as set forth in claim 1 wherein said support and contact member is double bladed and includes a connecting bight portion that is provided with a plurality of apertures through which the lamp leads extend.

12. A disposable planar photoflash lamp array designed for use with static electronic flashing circuits comprising a substantially rigid printed circuit support and contact member formed at one edge with a projecting tab for insertion into an edge connector assembly, said support and contact member comprising a relatively thin substrate having on at least one surface thereof electrically conductive patterns in the form of a plurality of aligned terminal strips on the projecting tab that are selectively interconnected with a plurality of lamp contact areas, a planar group of photoflash lamps each having a pair of leads secured in electrical connection with respective ones of said lamp contact areas, all the said lamp contact areas and terminal areas connected to said leads being located on the same one side of said support and contact member and the lamp contact areas connected to one lead of each lamp being electrically coupled together in common to a common terminal strip, at least one reflector located adjacent said group of photoflash lamps for reflecting light emitted therefrom toward a desired direction, and mounting means for holding together said support and contact member and attached group of lamps, and said reflector, as a unitary pluggable structure.

13. A construction as set forth in claim 12 wherein said support and contact member is single bladed and has conductive patterns on both sides thereof, and there is a planar group of photoflash lamps attached to each side of said member.

14. A construction as set forth in claim 12 wherein said support and contact member is double bladed and folded into a U-shaped with a connecting bight portion that is provided with a plurality of apertures through which the lamp leads extend, and said member further includes wing portions that are folded inwardly toward one another.

15. A construction as set forth in claim 12 wherein said support and contact member is multibladed.

16. A construction as set forth in claim 2 further including an elongated mounting block member within one side of which said support and contact member has a snug sliding interfit and is seated to support it in place therein, said mounting block member having a through-slot therein through which the said projecting tab on said support and contact member and projects from the other side of said mounting block member to expose thereat the said terminal areas on said projecting tab.

17. A construction as set forth in claim 2 further including an elongated mounting block member having slot-shaped recess portions in one side thereof within which the said support and contact member is snugly received and seated to support it in place therein, said mounting block member further having a through-slot therein longitudinally aligned with said slot-shaped recess portions and through which the said projecting tab on said support and contact member extends and projects from the other side of said mounting block member to expose thereat the said terminal areas on said projecting tab.

18. A construction as set forth in claim 16 wherein said mounting block member has slot-shaped recess portions longitudinally aligned with and located on opposite sides of said through-slot and within which the said support and contact bar is snugly received and seated to support it in place in said mounting block member.

19. A construction as set forth in claim 12 further including an elongated mounting block member within one side of which said support and contact member has a snug sliding interfit and is seated to support it in place therein, said mounting block member having a through-slot therein through which the projecting tab on said support and contact member extends and projects from the other side of said mounting block member to expose thereat the said terminal strips on said projecting tab.

20. A construction as set forth in claim 12 further including an elongated mounting block member having slot-shaped recess portions in one side thereof within which the said support and contact member is snugly received and seated to support it in place therein, said mounting block member further having a through-slot therein longitudinally aligned with said slot-shaped recess portions and through which the said projecting tab on said support and contact member extends and projects from the other side of said mounting block member to expose thereat the said terminal strips on said projecting tab.

21. A construction as set forth in claim 2 wherein the said support and contact member is of bar-shaped form on which the said lamp contact areas are all located in spaced and substantially aligned relation therealong, and wherein those of said lamp contact areas that are electrically coupled together to a common terminal area are interconnected by an electrically conductive line on said bar-shaped support and contact member extending therealong adjacent the other side edge thereof from the said projecting tab thereon and located between the said other side edge and all the other ones of said lamp contact areas but spaced from the latter.

UNITED STATES PATENT OFFICE
CERTIFICATE OF CORRECTION

Patent No. 3,598,985 Dated August 10, 1971

Inventor(s) John D. Harnden, Jr. et al.

It is certified that error appears in the above-identified patent and that said Letters Patent are hereby corrected as shown below:

Column 2, line 36, cancel "the". Column 3, line 10, after "sealed" insert -- bulb --. Column 9, line 42, "U-shape" should read -- said --. Column 10, line 44, "U-shaped" should read -- U-shape --; line 55, after "contact member" insert -- extends --.

Signed and sealed this 29th day of August 1972.

(SEAL)
Attest:

EDWARD M.FLETCHER,JR.
Attesting Officer

ROBERT GOTTSCHALK
Commissioner of Patents